United States Patent
Aggarwal et al.

(10) Patent No.: US 12,322,007 B2
(45) Date of Patent: Jun. 3, 2025

(54) SYSTEMS AND METHODS FOR COLOR PALETTE OPTIMIZATION

(71) Applicant: ADOBE INC., San Jose, CA (US)

(72) Inventors: Pranav Vineet Aggarwal, Santa Clara, CA (US); Midhun Harikumar, Sunnyvale, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 488 days.

(21) Appl. No.: 17/655,035

(22) Filed: Mar. 16, 2022

(65) Prior Publication Data

US 2023/0298224 A1 Sep. 21, 2023

(51) Int. Cl.
| | | |
|---|---|---|
| G06V 10/00 | (2022.01) | |
| G06F 16/538 | (2019.01) | |
| G06F 16/583 | (2019.01) | |
| G06N 3/045 | (2023.01) | |
| G06T 11/00 | (2006.01) | |
| G06T 11/80 | (2006.01) | |

(52) U.S. Cl.
CPC .......... *G06T 11/001* (2013.01); *G06F 16/538* (2019.01); *G06F 16/5838* (2019.01); *G06N 3/045* (2023.01); *G06T 11/80* (2013.01)

(58) Field of Classification Search
CPC .... G06T 11/001; G06T 11/80; G06F 16/5838; G06N 3/045; G06N 3/0455; G06N 3/084; G06N 3/09
See application file for complete search history.

(56) References Cited

U.S. PATENT DOCUMENTS

| 10,713,821 | B1* | 7/2020 | Surya | G06N 3/045 |
| 2022/0005235 | A1* | 1/2022 | Gou | G06N 3/02 |
| 2022/0108417 | A1* | 4/2022 | Liu | G06T 1/0007 |
| 2024/0112088 | A1* | 4/2024 | Yu | G06F 40/284 |

FOREIGN PATENT DOCUMENTS

| CN | 109543159 A | * | 3/2019 | .......... G06F 40/126 |
| CN | 110197229 A | * | 9/2019 | .......... G06K 9/6256 |
| CN | 111062865 A | * | 4/2020 | .............. G06N 3/04 |

OTHER PUBLICATIONS

Taming Transformers for High-Resolution Image Synthesis Patrick Esser, Robin Rombach, Bjorn Ommer; Proceedings of the IEEE/CVF Conference on Computer Vision and Pattern Recognition (CVPR), 2021, pp. 12873-12883 (Year: 2021).*

(Continued)

*Primary Examiner* — Vu Le
*Assistant Examiner* — Zaid Muhammad Saleh
(74) *Attorney, Agent, or Firm* — CHAU & ASSOCIATES, LLC

(57) ABSTRACT

A method and system for color optimization in generated images are described. The method and system include receiving an image generation prompt that includes a text description of target image content and color information describing a target color palette; encoding the image generation prompt to obtain image features that represent the target image content and the target color palette; and generating an image representing the target image content with the target color palette based on the image features.

19 Claims, 11 Drawing Sheets

(56) References Cited

OTHER PUBLICATIONS

CLIP-Art: Contrastive Pre-Training for Fine-Grained Art Classification Marcos V. Conde, Kerem Turgutlu; Proceedings of the IEEE/CVF Conference on Computer Vision and Pattern Recognition (CVPR) Workshops, 2021, pp. 3956-3960 (Year: 2021).*

Tan, et al., "EfficientNet: Rethinking Model Scaling for Convolutional Neural Networks", arXiv preprint arXiv:1905.11946v5 [cs.LG] Sep. 11, 2020, 11 pages.

TensorFlow Hub, "universal-sentence-encoder-multilingual-large", retrieved Feb. 18, 2022, available at https://tfhub.dev/google/universal-sentence-encoder-multilingual-large/3, 5 pages.

Esser, et al., "Taming Transformers for High-Resolution Image Synthesis", arXiv preprint arXiv:2012.09841v3 [cs.CV] Jun. 23, 2021, 52 pages.

Radford, et al., "Learning Transferable Visual Models from Natural Language Supervision", arXiv preprint arXiv:2103.00020v1 [cs.CV] Feb. 26, 2021, 48 pages.

Nerdyrodent, VQGAN-CLIP, retrieved Feb. 18, 2022, available at https://github.com/nerdyrodent/VQGAN-CLIP, 12 pages.

\* cited by examiner

SYSTEMS AND METHODS FOR COLOR PALETTE OPTIMIZATION

BACKGROUND

The following relates generally to image generation, and more specifically to color optimization in generated images.

Conventional image generation systems use machine learning models such as generative adversarial networks to generate images in response to user prompts. A GAN produces images by iteratively updating a generator network to decode an encoded image such that a discriminator network of the GAN does not recognize that the output image is a generated image when compared to the encoded image. However, the conventional image generation systems do not generate images based on user-specified color palettes. For example, images generated by these models are not able to obtain a strict color palette (i.e., a color palette that closely adheres to a user-intended color palette that is provided independently of the target image content).

SUMMARY

A method and system for color optimization in generated images are described. One or more aspects of the method and system include receiving an image generation prompt that includes a text description of target image content and color information describing a target color palette; encoding the image generation prompt to obtain image features that represent the target image content and the target color palette; and generating an image representing the target image content with the target color palette based on the image features.

A method and system for color optimization in generated images are described. One or more aspects of the method and system include receiving training data including a training image and color information describing a target color palette; generating an output image based on the training image using a machine learning model; generating a first color embedding based on the color information; generating a second color embedding based on the output image; and updating the machine learning model based on the first color embedding and the second color embedding.

An apparatus and system for color optimization in generated images are described. One or more aspects of the apparatus and system include a query component configured to receive an image generation prompt that includes a text description of target image content and color information describing a target color palette; a multi-modal encoder configured to encode the image generation prompt to obtain image features that represent the target image content and the target color palette; and an image decoder configured to generate an image representing the target image content with the target color palette based on the image features, wherein the image decoder is trained based on a comparison of a color text description to output image colors.

DETAILED DESCRIPTION

Figure 1:
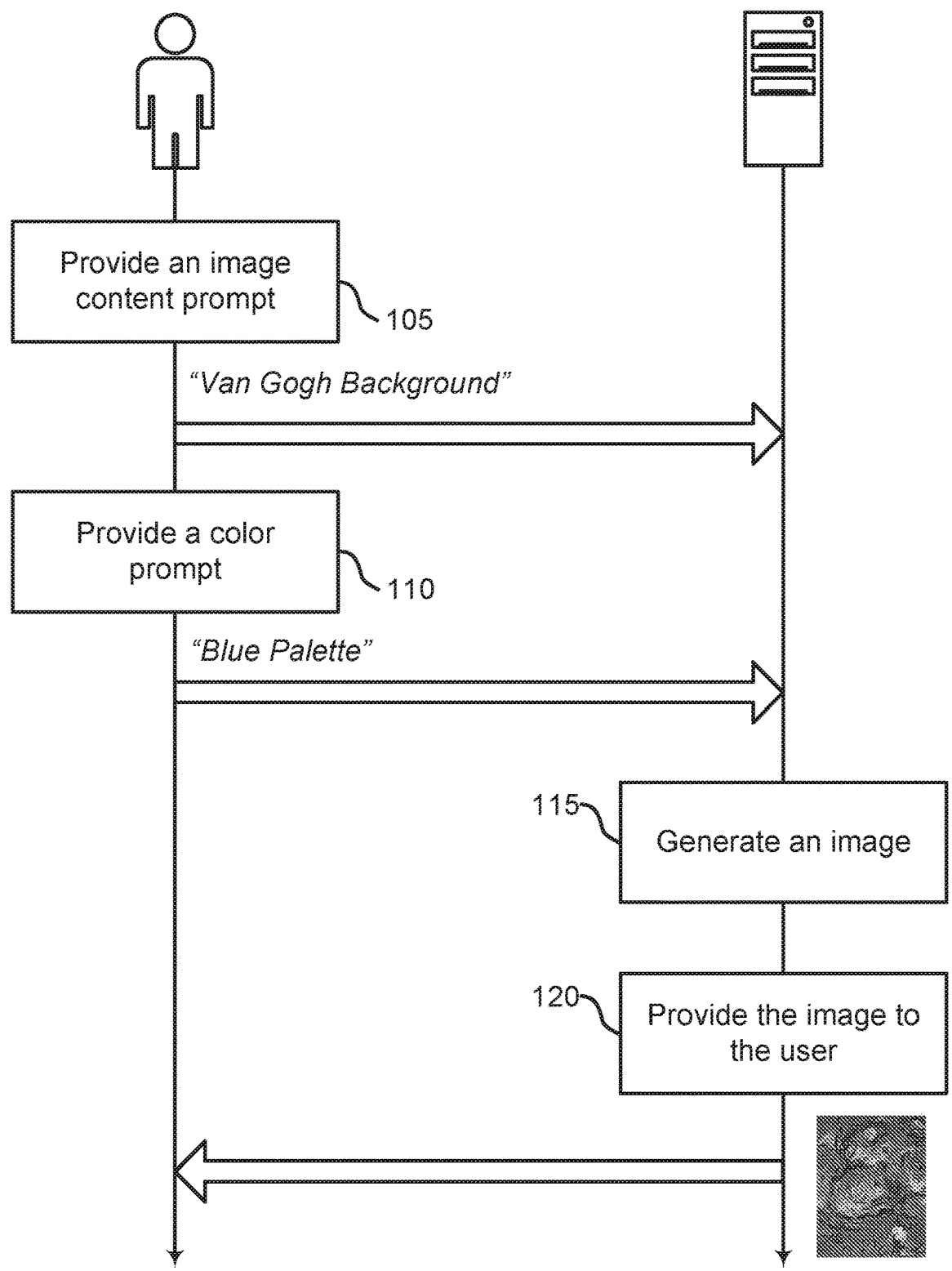
FIG. 1 shows an example of color-optimized image generation according to aspects of the present disclosure.

The present disclosure provides systems and methods for color optimization for generated images. At least one embodiment of the present disclosure receives an image generation prompt that includes a text description of a target image content and color information describing a target palette, encodes the image generation prompt to obtain image features that represent the target image content and the target color palette, and generates an image representing the target image content with the target color palette based on the image features.

Conventional image generation systems use machine learning models such as generative adversarial networks to generate images in response to user prompts. However, the conventional image generation systems do not generate images based on user-specified color palettes. For example, images generated by these models are not able to obtain an optimized color palette (i.e., a color palette that closely adheres to a user-intended color palette that is provided independently of the target image content).

Accordingly, at least one embodiment of the present disclosure allows a user to obtain a generated image with an optimized color palette by providing an image generation prompt including text description of an image the user would like to generate (a target image), as well as a color description of the target image. The color description may be provided as text description of a color palette or a visual depiction of the target color palette. At least one embodiment of the present disclosure includes a machine learning model that encodes the image generation prompt and generates an image that represents the target image content with the target color palette. Therefore, by using the at least one embodiment of the present disclosure, a user may generate a new image with intended content and with a color palette that closely matches an intended color palette that may be provided independently of the intended content.

At least one embodiment of the inventive concept is used in an image generation context. For example, the at least one embodiment uses a machine learning model to generate an image having content specified by a text prompt and a color palette specified by a color prompt. In at least one embodiment, the color prompt is a text description of a target color palette. In at least one embodiment, the color prompt is an image that includes the target color palette.

An example application of the inventive concept in the image generation context is provided with reference to FIGS. 1-6. Details regarding the architecture of an example color optimization apparatus are provided with reference to FIGS. 7-9. Examples of a process for training a machine learning model are provided with reference to FIGS. 10-11.

Color Optimization

A method for color optimization in generated images is described. One or more aspects of the method include receiving an image generation prompt that includes a text description of target image content and color information describing a target color palette; encoding the image generation prompt to obtain image features that represent the target image content and the target color palette; and generating an image representing the target image content with the target color palette based on the image features.

Some examples of the method further include encoding the text description using a multi-modal encoder to obtain content features. Some examples further include encoding the color information using a text-to-color encoder to obtain color features, wherein the image features comprise the content features and the color features.

Some examples of the method further include computing a color loss by comparing a color embedding of the image and an embedding of the target color palette. Some examples further include updating the image features based on the loss. Some examples further include regenerating the image based on the updated image features. In some aspects, the color information includes a visual or a text description of the target color palette.

Some examples of the method further include quantizing the image features based on a feature codebook to obtain first quantized image features. Some examples further include decoding the first quantized image features to obtain an initial image. Some examples further include computing a content loss based on the content features and the initial image. Some examples further include computing a color loss based on the color features and the initial image.

Some examples of the method include adding the content loss and the color loss to obtain a combined loss. Some examples further include back-propagating the combined loss. Some examples further include quantizing the image features based on a feature codebook and the combined loss to obtain second quantized image features. Some examples further include decoding the second quantized image features to obtain the image.

FIG. 1 shows an example of color-optimized image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 1, in at least one embodiment, the system generates an image based on a text description of the image and color information of the image and provides the image to a user.

At operation 105, the user provides an image content prompt. In some cases, the operations of this step refer to, or may be performed by, a user as described with reference to FIG. 6. For example, the user may provide a text description of a target image content including the image content prompt via a user device to a query component of a machine learning apparatus as described with reference to FIG. 7. The image content prompt may directly describe the intended content of the image to be generated (e.g., "beach"), or may more generally describe a style of the content of the image to be generated (e.g., "Van Gogh background"). In at least one embodiment, the image content prompt of the image generation prompt includes an image rather than a text description of the target image content, and the image depicts the target image content.

At operation 110, the user provides a color prompt. In some cases, the operations of this step refer to, or may be performed by, a user as described with reference to FIG. 6. For example, the user may provide color information of a target image content including the color prompt via a user device to a query component of a machine learning apparatus as described with reference to FIG. 7. In at least one embodiment, the color information is a text description of a color palette of the image to be generated (e.g., "blue palette"). In at least one embodiment, the color information is a visual description of the color palette of the image to be generated (e.g., an image that includes colors to be included in the image to be generated). In at least one embodiment, the color information is a color embedding. In at least one embodiment, the color information is a histogram.

At operation 115, the system generates an image. In some cases, the operations of this step refer to, or may be performed by, a machine learning apparatus as described with reference to FIGS. 7 and 8. For example, a machine learning model of the machine learning apparatus may receive the image content prompt and color prompt as inputs and output an image that includes content specified by the image content prompt and a color palette specified by the color prompt.

At operation 120, the system provides the image to the user. In some cases, the operations of this step refer to, or may be performed by, a machine learning apparatus as described with reference to FIGS. 7 and 8. For example, the machine learning apparatus may provide the image to the user via a user device as described with reference to FIG. 7. In at least one embodiment, the machine learning apparatus stores the image in a database as described with reference to FIG. 7.

Figure 2:
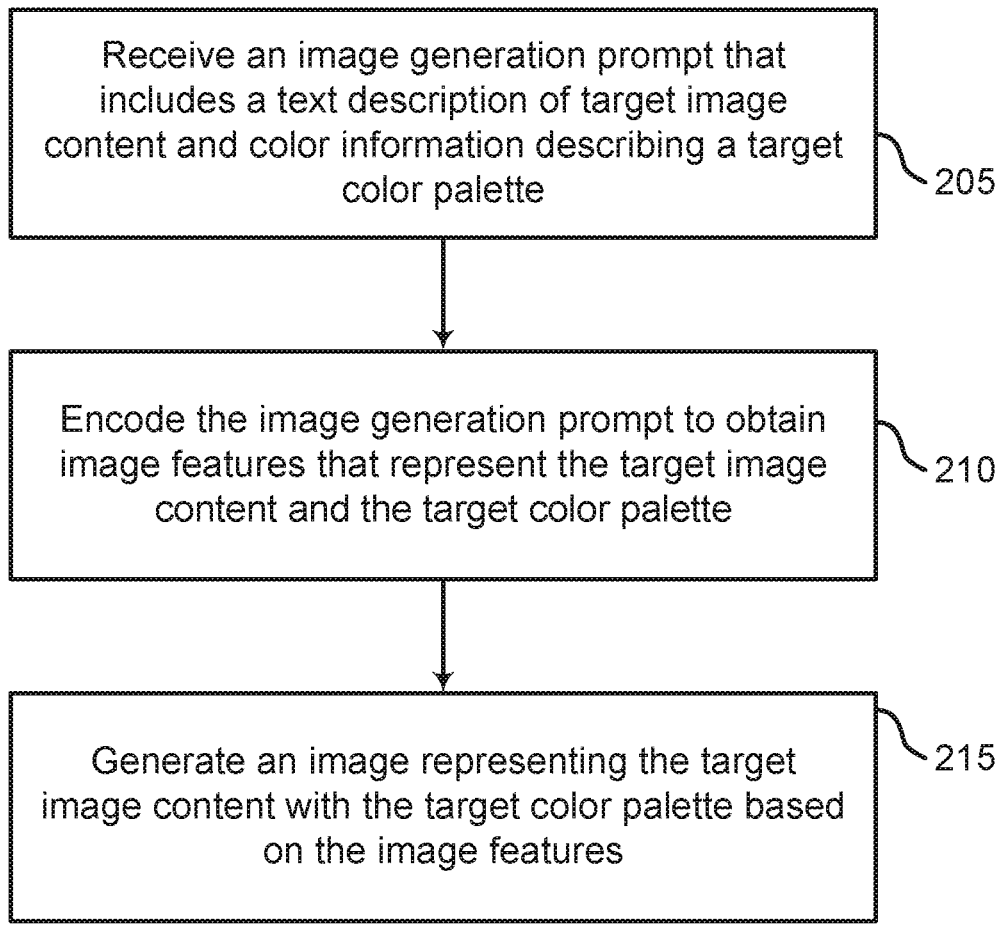
FIG. 2 shows an example of image generation according to aspects of the present disclosure.

FIG. 2 shows an example of image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system receives an image generation prompt that includes a text description of target image content and color information describing a target color palette. In some cases, the operations of this step refer to, or may be performed by, a query component as described with reference to FIGS. 8 and 9. For example, the query component may receive the image generation prompt as described with reference to FIGS. 4-6.

At operation 210, the system encodes the image generation prompt to obtain image features that represent the target image content and the target color palette. In some cases, the operations of this step refer to, or may be performed by, a multi-modal encoder as described with reference to FIGS. 6 and 8-9. For example, the multi-modal encoder may encode the image generation prompt as described with reference to FIGS. 4-6.

At operation 215, the system generates an image representing the target image content with the target color palette based on the image features. In some cases, the operations of this step refer to, or may be performed by, an image decoder as described with reference to FIGS. 6 and 8-9. For example, the image decoder may generate the image representing the target image content with the target color palette as described with reference to FIGS. 4-6.

Figure 3:
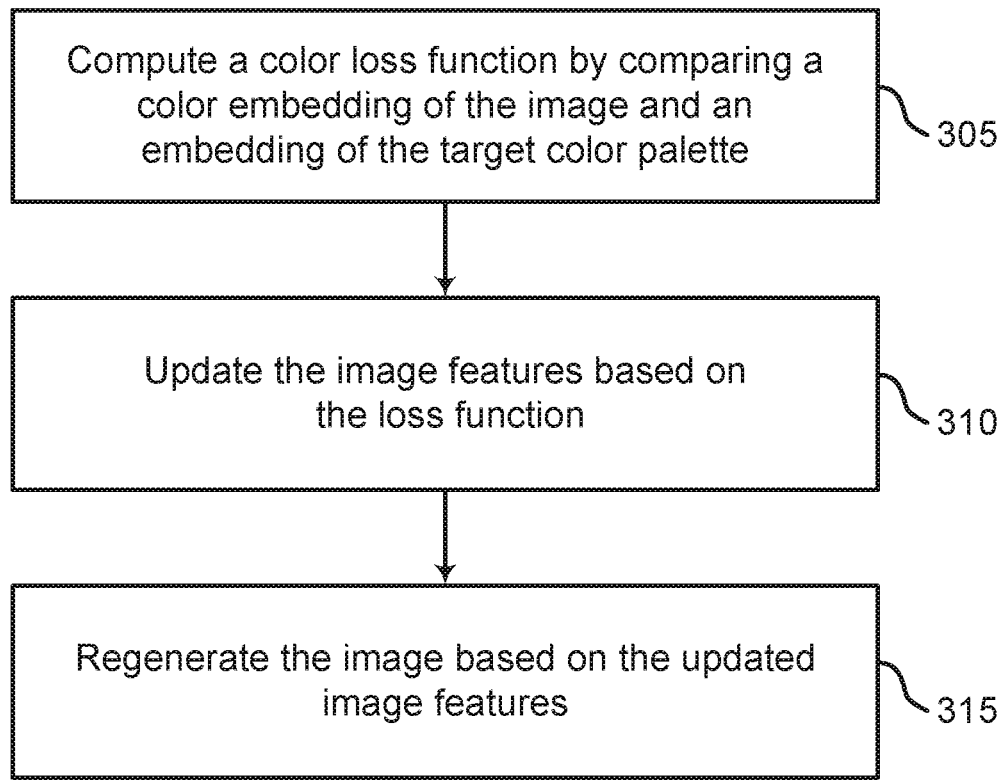
FIG. 3 shows an example of image regeneration according to aspects of the present disclosure.

FIG. 3 shows an example of image regeneration according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 3, after an image has been generated, the system computes a color loss that numerically describes a difference between the image and the target color palette for the image. The system may update the image features by back-propagating the color loss to the image features. The system may then regenerate the image based on the updated image features. This process may be repeated until a difference between the colors in a generated image and the colors in the target color palette is minimized. Therefore, the term "optimized color palette" refers to a color palette of a generated image that closely adheres to a user-intended color palette. For example, the color palette of an image may be optimized by minimizing distances between vector representations of colors provided by a user (whether as a text description of the colors or as images of the colors) and colors included in a generated image.

At operation 305, the system computes a color loss by comparing a color embedding of the image and an embedding of the target color palette. In some cases, the operations of this step refer to, or may be performed by, a training component as described with reference to FIG. 8. For example, the training component may compute a color loss by comparing a color embedding of the image an embedding of the target color palette as described with reference to FIG. 6.

At operation 310, the system updates the image features based on the color loss. In some cases, the operations of this step refer to, or may be performed by, a training component as described with reference to FIG. 8. For example, the training component may update the image features based on the color loss as described with reference to FIG. 6.

At operation 315, the system regenerates the image based on the updated image features. In some cases, the operations of this step refer to, or may be performed by, an image decoder as described with reference to FIGS. 4 and 8-9. For example, the image decoder may regenerate the image based on the updated image features as described with reference to FIG. 6.

Figure 4:
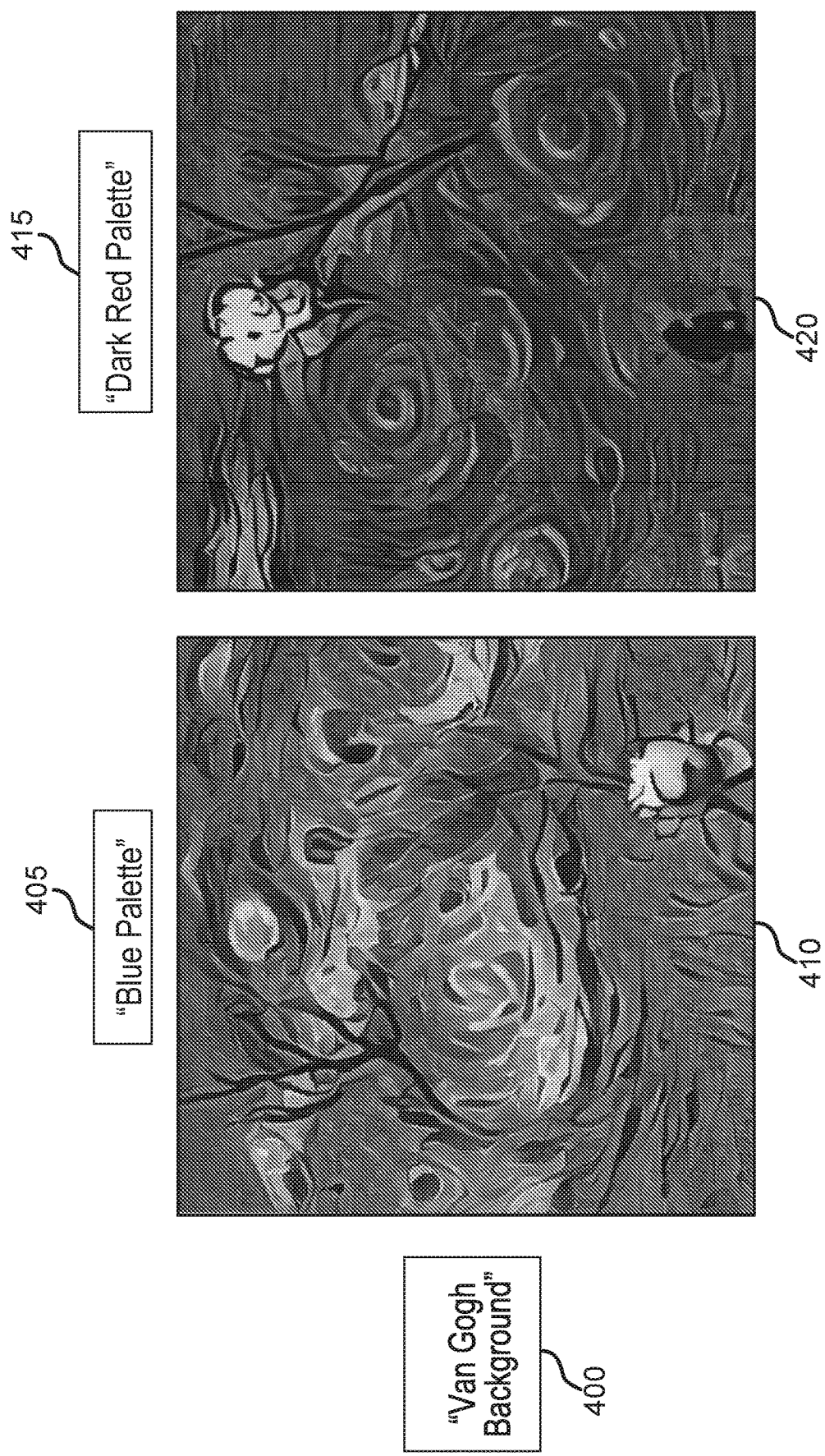
FIG. 4 shows an example of an image generation prompt including a text description of a target color palette according to aspects of the present disclosure.
Figure 5:
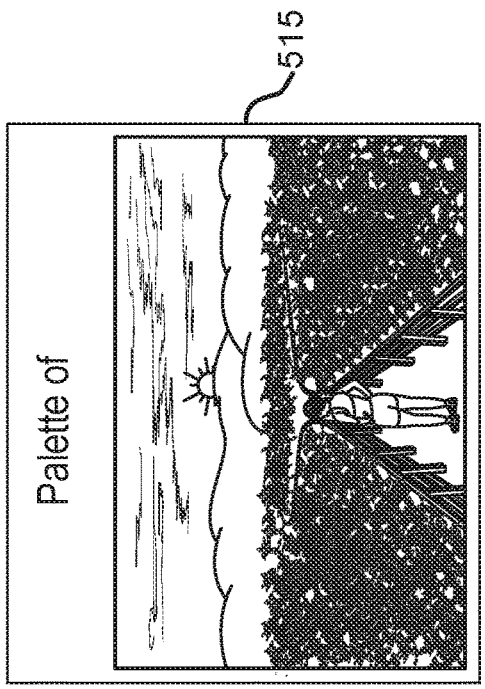
FIG. 5 shows an example of an image generation prompt including a visual description of a target color palette according to aspects of the present disclosure.
Figure 5:
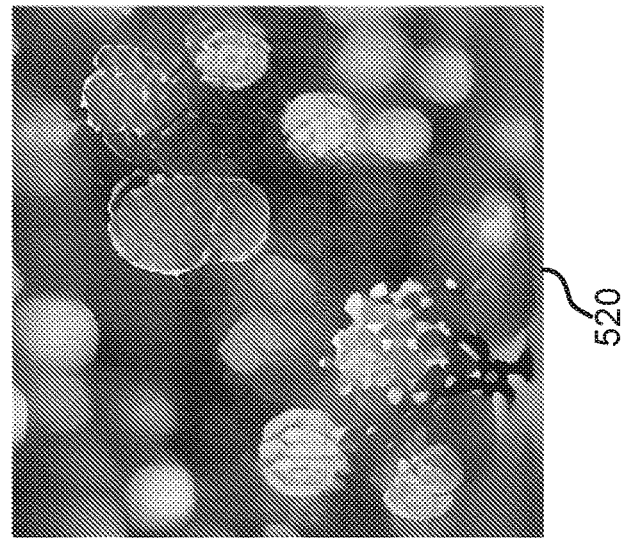
Figure 5:
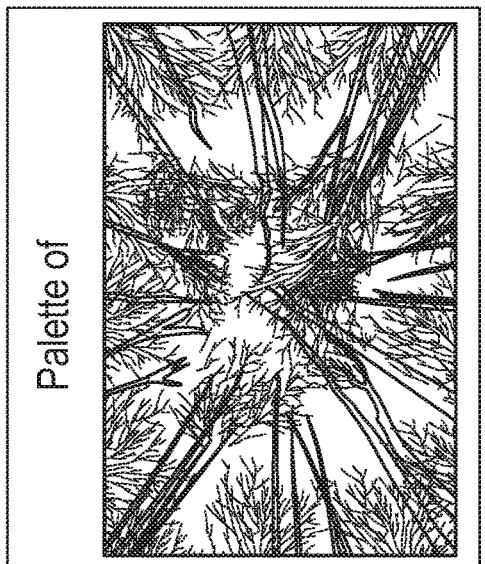
Figure 5:
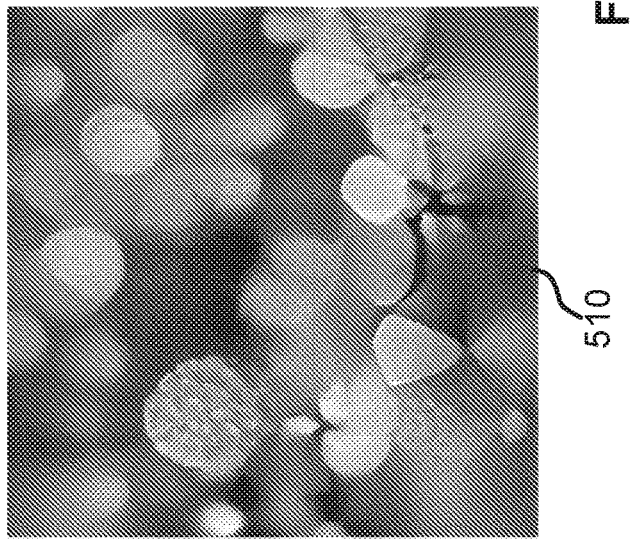

FIG. 4 shows an example of an image generation prompt including a text description of a target color palette according to aspects of the present disclosure. The example shown includes text description 400, first color information 405, first image 410, second color information 415, and second image 420. FIG. 5 shows an example of an image generation prompt including a visual description of a target color palette according to aspects of the present disclosure. The example shown includes text description 500, first color information 505, first image 510, second color information 515, and second image 520.

Referring to FIGS. 4 and 5, in at least one embodiment, a query component of a machine learning apparatus as described with reference to FIGS. 7 and 8 receives an image generation prompt. For example, an image generation prompt may include a text description of a target image content such as text descriptions 400 or 500 and color information such as first color information 405 or 505 or second color information 415 or 515. In at least one embodiment, the image generation prompt includes an image depicting the target image content and does not include a text description of the target image content.

The text description of the target image content may directly describe the intended content of the image to be generated (e.g., "beach"), or may more generally describe a style of the content of the image to be generated. For example, text description 400 is "Van Gogh Background", and text description 500 is "Bokeh background". The color information may be a text description of a color palette for the target image to be generated (for example, first color information 405, "blue palette", or second color information 415, "dark red palette"), or may be a visual depiction of the color palette for the target image to be generated (for example, first color information 505 or second color information 515, both of which are images that include different color palettes from each other).

The image generation prompt may be provided from a user via a user device as described with reference to FIG. 7 to the query component of the machine learning apparatus. For example, the user device may include software that interacts with the machine learning apparatus to prompt the user to enter the image generation prompt. In at least one embodiment, the query component may retrieve images from a database as described with reference to FIG. 7 in response to a user query and provide the images to the user via the user device, and the user may use one of the retrieved images to provide the color information of the image generation prompt.

In at least one embodiment, the image generation prompt is a random selection chosen by a user. For example, the user may select an option to randomly generate an image, the query component may choose target image content information (whether as text or as an image) and target color information (whether as text or as an image) from a database, and the query component may instruct a user interface of a user device to display the target content information and the target color information so that the user may confirm the selection or choose different information. In some examples, the query component might not provide the selection to be confirmed by the user.

In at least one embodiment, the query component provides the image generation prompt to a multi-modal encoder of the machine learning model, and the multi-modal encoder encodes the image generation prompt to obtain image features that represent the target image content and the target color palette. In at least one embodiment, the multi-modal encoder encodes the text description to obtain content features.

In at least one embodiment, the machine learning model encodes the color information using a text-to-color encoder to obtain color features. For example, the text-to-color encoder is a neural network that has been trained to convert a text description of color information to an embedding that is in a same embedding space as pixel color embeddings.

The training of the text-to-color encoder will be described in further detail with reference to FIGS. 10 and 11.

In at least one embodiment, the machine learning model encodes the color information using an image-to-color encoder to obtain the color features. For example, the image-to-color encoder is a neural network that has been trained to convert a visual depiction of the color information to an embedding. The training of the image-to-color encoder will be described in further detail with reference to FIGS. 10 and 11. In at least one embodiment, the image features include the content features and the color features.

In at least one embodiment, an image decoder of the machine learning model receives the image features and decodes the image features to generate an image representing the target image content with the target color palette based on the image features. The machine learning model may generate the image using an image decoder. For example, the image decoder may include a generative adversarial network (GAN), and the GAN may use a generator network that is iteratively updated based on an encoder network and a discriminator network to output images that increasingly reflect the input encodings. For example, during a first iteration, the generator network may decode the image features to produce a first image. During subsequent iterations, the first image may be encoded by an image encoder, and the discriminator network may update the generator network to output subsequent images until the encoding of the images match the image features. In at least one embodiment, the image encoder and the multi-modal encoder are separate components. In at least one embodiment, the multi-modal encoder is the image encoder.

Referring to FIG. 4, the machine learning model may generate first image 410 that includes content based on text description 400 and a color palette based on first color information 405, or second image 420 that includes content based on text description 400 and a color palette based on second color information 415. Likewise, referring to FIG. 5, the machine learning model may generate first image 510 based on text description 500 and first color information 505, or may generate second image 520 based on text description 500 and second color information 515.

Text description 400 is an example of, or includes aspects of, the corresponding element described with reference to FIGS. 5 and 9. Text description 500 is an example of, or includes aspects of, the corresponding element described with reference to FIGS. 4 and 9. First color information 405 is an example of, or includes aspects of, the corresponding element described with reference to FIG. 5. First color information 505 is an example of, or includes aspects of, the corresponding element described with reference to FIG. 4. First image 410 is an example of, or includes aspects of, the corresponding element described with reference to FIG. 5. First image 510 is an example of, or includes aspects of, the corresponding element described with reference to FIG. 4. Second color information 415 is an example of, or includes aspects of, the corresponding element described with reference to FIG. 5. Second color information 515 is an example of, or includes aspects of, the corresponding element described with reference to FIG. 4. Second image 420 is an example of, or includes aspects of, the corresponding element described with reference to FIG. 5. Second image 520 is an example of, or includes aspects of, the corresponding element described with reference to FIG. 4.

Figure 6:
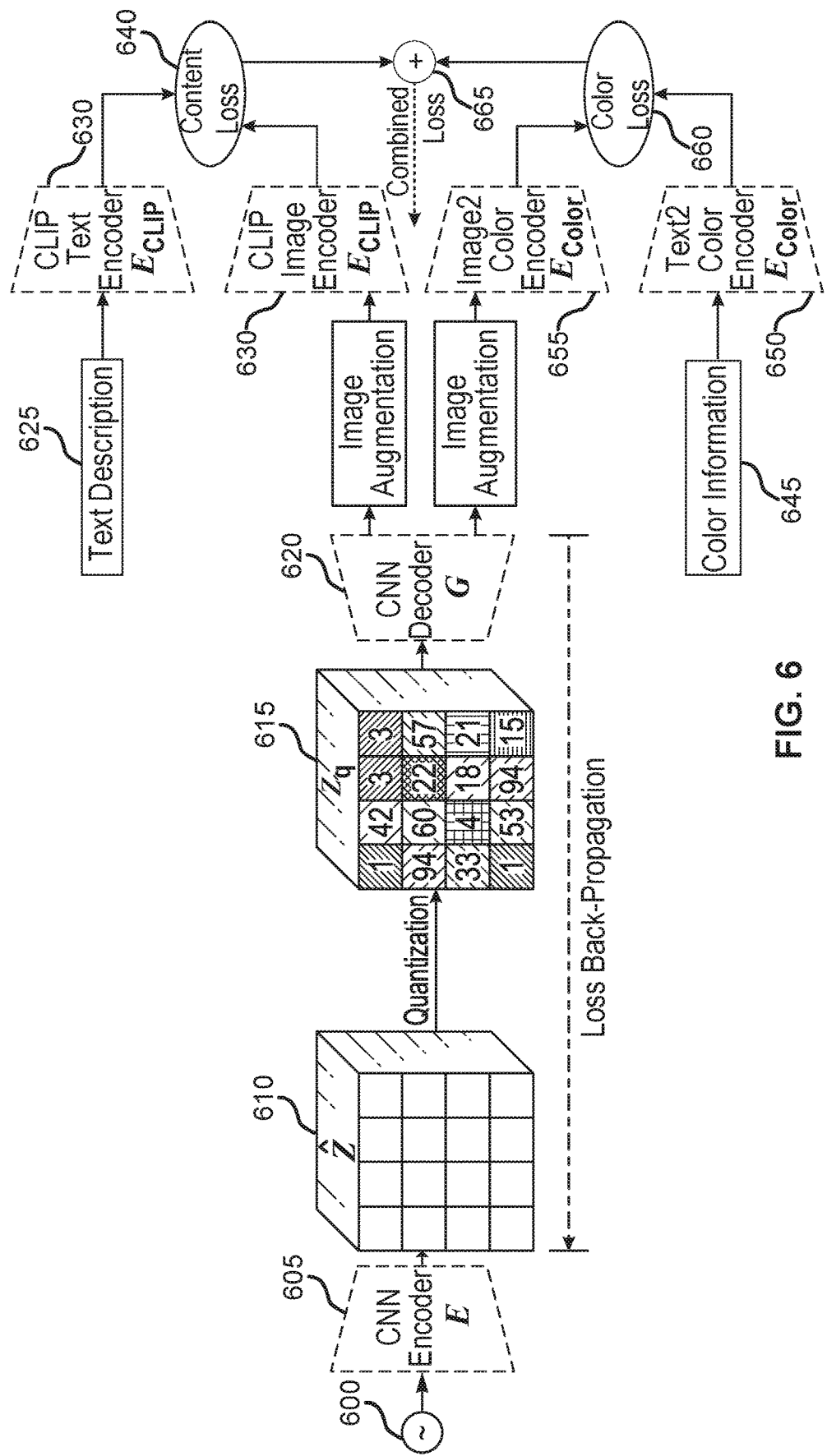
FIG. 6 shows an example of image generation based on one or more losses according to aspects of the present disclosure.

FIG. 6 shows an example of image generation based on one or more losses according to aspects of the present disclosure. The example shown includes input image 600, image encoder 605 and generator network 620 of an image decoder included in a machine learning apparatus as described with reference to FIGS. 7 and 8, image embedding 610, quantized image embedding 615, text description 625, multi-modal encoder 630 of the machine learning apparatus, content loss 635, color information 640, text-to-color encoder 645 of the machine learning apparatus, image-to-color encoder 650 of the machine learning apparatus, color loss 655, and combined loss 660.

FIG. 6 illustrates an iterative process in which an image is regenerated based on losses until the color palette of a final generated image is optimized. Referring to FIG. 6, image encoder 605 may receive input image 600. In at least one embodiment, input image 600 is a training image. In at least one embodiment, input image 600 is an image that has been generated by the image decoder based on an image generation prompt.

In at least one embodiment, image encoder 605 is a CNN encoder. Image encoder 605 may embed input image 600 (for example, a generated image such as first images 410 and 510 or second images 420 and 520, or a training image) in n×n feature blocks to obtain image embedding 610. The image decoder may quantize image embedding 610 based on a feature codebook to obtain quantized images embedding 615. For example, the image decoder may divide image embedding 610 into the plurality of feature blocks, and select a code from the feature codebook that is closest to each of the plurality of feature blocks. Generator network 620 may decode quantized image embedding 615 to obtain an initial image. In at least one embodiment, generator network 620 is a CNN decoder.

A training component of the machine learning apparatus may compute content loss 635 based on content features and the initial image. For example, a query component may provide text description 625 of the image generation prompt to multi-modal encoder 630, and generator network 620 may provide the initial image to multi-modal encoder 630. Multi-modal encoder 630 may encode text description 625 of the image generation prompt to obtain content features (e.g., a first content embedding), and may generate a second content embedding based on the initial image. In at least one embodiment, the query component provides an image depicting target image content to multi-modal encoder 630, and multi-modal encoder 630 encodes the image depicting target image content to obtain the first content embedding. For example, multi-modal encoder 630 may generate embeddings of text and images as described with reference to FIGS. 4 and 5. The training component may compute content loss 635 based on the content features and the second content embedding. In at least one embodiment, content loss 635 is a mean squared error loss.

The training component may compute color loss 655 by comparing a color embedding of the initial image (e.g., a second color embedding) and an embedding of the target color palette (e.g., a first color embedding). For example, the training component may compute color loss 655 based on color features (e.g., the first color embedding) and the initial image. In at least one embodiment, the query component provides color information 640 of the input generation prompt to text-to-color encoder 645, and text-to-color encoder 645 outputs the color features (e.g., the first color embedding). For example, text-to-color encoder 645 may convert text into a color embedding in a same embedding space as pixel color embeddings. In at least one embodiment, text-to-color encoder 645 is pretrained on a dataset that includes text description of colors and color embeddings of corresponding RGB values. Text-to-color encoder 645 may convert color information 640 into a sentence embedding. In at least one embodiment, the sentence embedding is a cross-lingual sentence embedding produced by a model such as Multi-lingual USE. In at least one embodiment, text-to-color encoder 645 includes blocks of fully connected, ReLu and L2 norm layers, and text-to-color encoder 645 may pass the sentence embedding to the blocks.

Text-to-color encoder 645 may collect samples from the dataset using a negative mining strategy of finding a pair of sample embeddings with similar but not the same corresponding color information to obtain hard negatives. The training component may use a metric learning loss similar to a triplet loss to fine-tune the text-to-color encoder 645 such that a generated color embedding such as the first color embedding is pushed closer to a corresponding positive color embedding and pushed away from a corresponding negative color embedding.

Image-to-color encoder 650 may generate a second color embedding based on the initial image. For example, image-to-color encoder 650 may convert the initial image from "RBG" color space to "LAB" color space. If two color vectors in RGB space are close to each other in terms of L2 distance, they are not necessarily close to each other in terms of human visual perception. By contrast, in LAB color space, color vectors are designed to be perceptually uniform with respect to human color vision, meaning that an amount of numerical change in color vectors corresponds to a same amount of visually perceivable change.

Accordingly, in at least one embodiment, image-to-color encoder 650 uses 3D histograms in LAB space to generate the second color embedding. Image-to-color encoder 650 may concatenate two histograms to obtain one feature vector. In at least one embodiment, image-to-color encoder 650 calculates a first histogram using [9, 7, 8] interval sizes and a second histogram using [10, 10, 10] interval sizes. Image-to-color encoder 655 may take the square root of each number in the feature vector to obtain the second color embedding.

In at least one embodiment, the training component trains a regression model of the machine learning model using training images and associated histogram color embeddings (for example, a training image and an associated second color embedding) as ground truths to generate similar color embeddings as the histogram color embeddings. In at least one embodiment, the regression model is an EfficientNet or similar network that includes a final layer having dimensions equal to the histogram color embeddings. The similar color embeddings may be used to calculate losses.

The training component may compute color loss 655 based on the color features and the second color embedding. In at least one embodiment, color loss 655 is a mean squared error loss.

FIG. 6 shows an example in which color information 640 is provided as text input to text-to-color encoder 645. However, in at least one embodiment, color information 640 is a visual depiction of the target color palette such as an image, and the visual depiction of the target color palette is input to image-to-color encoder 650 to generate the first color embedding. In this example, image-to-color encoder 650 also generates the second color embedding, and the training component calculates color loss 655 based on the first color embedding and the second color embedding.

In at least one embodiment, the training component updates image features (e.g., image embedding 610) by back-propagating content loss 635 to image features 610. In at least one embodiment, the training component updates the image features by back-propagating color loss 655 to the image features. In at least one embodiment, the training component adds content loss 635 and color loss 655 to obtain combined loss 660 and updates the image features based on combined loss 669 by back-propagating combined loss 669 to the image features.

The image decoder may regenerate the image based on the updated features. For example, the image decoder may quantize the updated image features based on the feature codebook and at least one of content loss 635, color loss 655, and combined loss 660 to obtain second quantized image features, and may decode the second quantized image features using generator network 620 to obtain an updated image. This process may be repeated until a vector distance between the content embeddings and color embeddings of the image and the image generation prompt is minimized. In this manner, the color of a generated image may be increasingly optimized over successive iterations.

The image decoder is an example of, or includes aspects of, the corresponding element described with reference to FIGS. 4-5 and 8-9. Image encoder 605 is an example of, or includes aspects of, the corresponding element described with reference to FIGS. 4 and 5. Generator network 620 is an example of, or includes aspects of, the corresponding element described with reference to FIGS. 4 and 5. Multi-modal encoder 630 is an example of, or includes aspects of, the corresponding element described with reference to FIGS. 8 and 9. Text-to-color encoder 645 is an example of, or includes aspects of, the corresponding element described with reference to FIGS. 4-5 and 8. Image-to-color encoder 650 is an example of, or includes aspects of, the corresponding element described with reference to FIG. 8.

Image embedding 610 is an example of, or includes aspects of, the corresponding element described with reference to FIG. 9. Quantized image embedding 615 is an example of, or includes aspects of, the corresponding element described with reference to FIGS. 4 and 5. Text description 625 is an example of, or includes aspects of, the corresponding element described with reference to FIGS. 1, 4-5, and 7. Content loss 635 is an example of, or includes aspects of, the corresponding element described with reference to FIGS. 4 and 5. Color information 640 is an example of, or includes aspects of, the corresponding element described with reference to FIGS. 1, 4-5, and 7. Color loss 655 is an example of, or includes aspects of, the corresponding element described with reference to FIGS. 4 and 5. Combined loss 660 is an example of, or includes aspects of, the corresponding element described with reference to FIGS. 4 and 5.

System Architecture

An apparatus for color optimization in generated images is described. One or more aspects of the apparatus include a query component configured to receive an image generation prompt that includes a text description of target image content and color information describing a target color palette; a multi-modal encoder configured to encode the image generation prompt to obtain image features that represent the target image content and the target color palette; and an image decoder configured to generate an image representing the target image content with the target color palette based on the image features, wherein the image decoder is trained based on a comparison of a color text description to output image colors.

Some examples of the apparatus further include a training component configured to update the image decoder based on the color text description and the output image colors. Some examples of the apparatus further include a text-to-color encoder configured to generate a color embedding based on the color text description, wherein the image features are based on the color embedding. Some examples of the apparatus further include an image-to-color encoder configured to generate a color embedding based on the output image colors, wherein the image features are based on the color embedding.

In some aspects, the multi-modal encoder is configured to generate output image features based on the generated image. In some aspects, the multi-modal encoder comprises a Contrastive Language-Image Pre-Training (CLIP) neural network. In some aspects, the image decoder includes a vector quantized general adversarial network (VQGAN).

Figure 7:
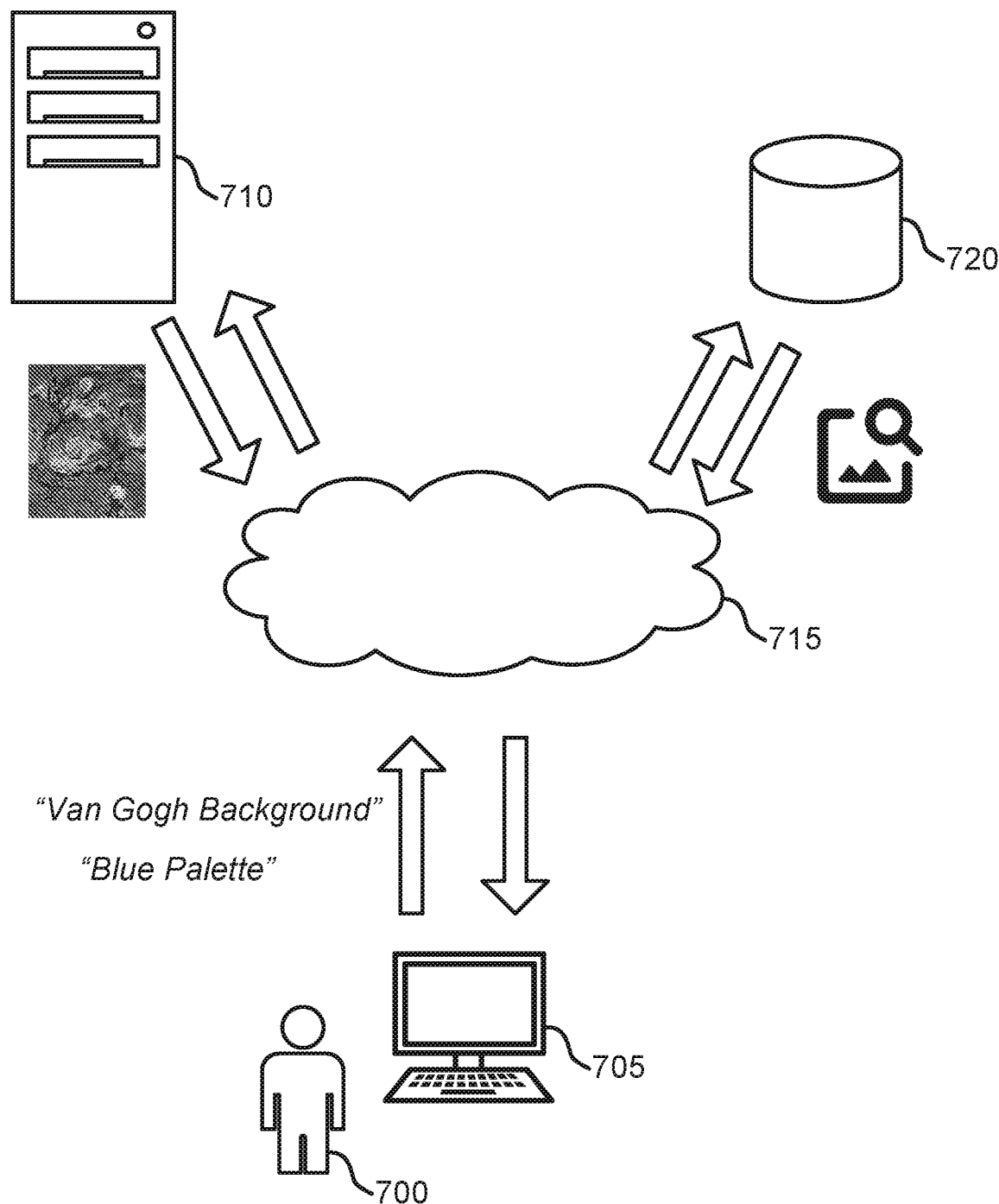
FIG. 7 shows an example of an image generation system according to aspects of the present disclosure.

FIG. 7 shows an example of an image generation system according to aspects of the present disclosure. The example shown includes user 700, user device 705, machine learning apparatus 710, cloud 715, and database 720.

Referring to FIG. 7, a user 700 may use the image generation system to submit an image generation prompt to machine learning apparatus 710 via user device 705 and cloud 715. The image generation prompt may include a text description of target image content (for example, "Van Gogh background", and color information describing a target color palette. Referring to FIG. 7, the color information is a text description of the target color palette (e.g., "blue palette"). In at least one embodiment, the color information is instead provided as an image that includes the target color palette. In at least one embodiment, the image that includes the color information is retrieved from database 720. In response to receiving the image generation prompt, machine learning apparatus 710 generates an image including the target image content and the color information specified by the image generation prompt and provides the image to user 700.

User device 705 may be a personal computer, laptop computer, mainframe computer, palmtop computer, personal assistant, mobile device, or any other suitable processing apparatus. In some examples, user device 705 includes software that interfaces with machine learning apparatus 710 and database 720 to retrieve and provide images, such as an image including color information for a target image, or an image generated by machine learning apparatus 710. The software may allow user 700 to input an image generation prompt as text or as an image. The software may include functionality that converts audio received from user 700 to text that may then be provided as the image generation prompt.

A user interface may enable a user 700 to interact with user device 705. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

Machine learning apparatus 710 may include a computer implemented network that includes a machine learning model including one or more neural networks. Machine learning apparatus 710 may also include one or more processors, a memory subsystem, a communication interface, an I/O interface, one or more user interface components, and a bus. Additionally, machine learning apparatus 710 may communicate with user device 705 and database 720 via cloud 715.

In some cases, machine learning apparatus 710 is implemented on a server. A server provides one or more functions to users 700 linked by way of one or more of the various networks. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Figure 8:
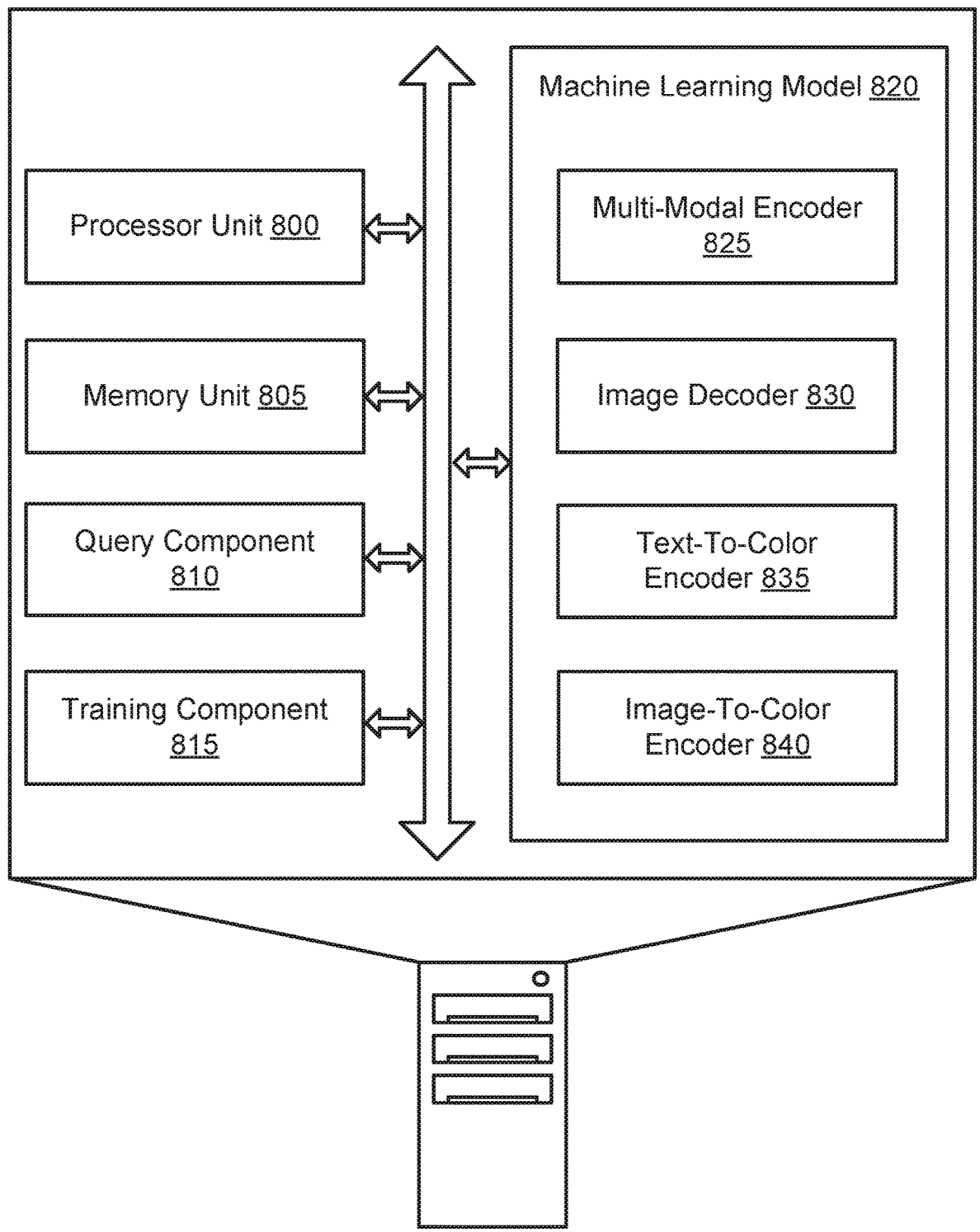
FIG. 8 shows an example of a machine learning apparatus according to aspects of the present disclosure.
Figure 9:
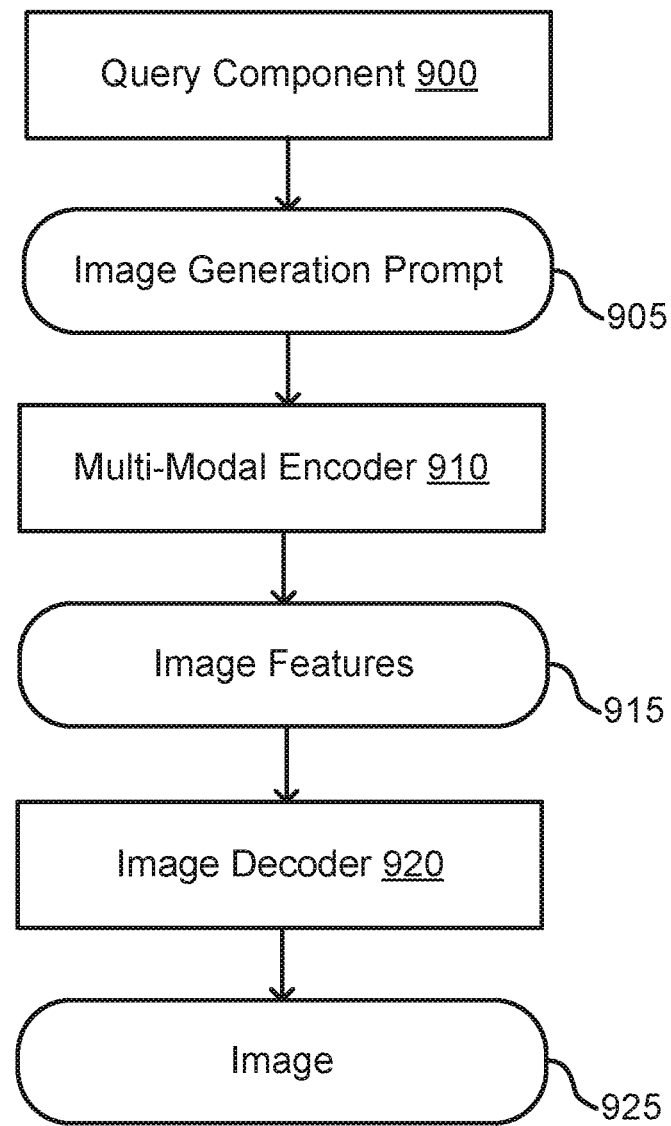
FIG. 9 shows an example of image generation according to aspects of the present disclosure.

Further detail regarding the architecture of machine learning apparatus 710 is provided with reference to FIGS. 8 and 9. Further detail regarding a process for optimizing color in generated images is provided with reference to FIGS. 1-6. Further detail regarding a process for updating the machine learning model is provided with reference to FIGS. 10-11.

A cloud such as cloud 715 is a computer network configured to provide on-demand availability of computer system resources, such as data storage and computing power. In some examples, cloud 715 provides resources without active management by user 700. The term "cloud" is sometimes used to describe data centers available to many users over the Internet. Some large cloud networks have functions distributed over multiple locations from central servers. A server is designated an edge server if it has a direct or close connection to a user. In some cases, cloud 715 is limited to a single organization. In other examples, cloud 715 is available to many organizations. In one example, cloud 715 includes a multi-layer communications network comprising multiple edge routers and core routers. In another example, cloud 715 is based on a local collection of switches in a single physical location.

A database such as database 720 is an organized collection of data. For example, database 720 stores data in a specified format known as a schema. Database 720 may be structured as a single database, a distributed database, multiple distributed databases, or an emergency backup database. In some cases, a database controller may manage data storage and processing in database 720. In some cases, user 700 interacts with the database controller. In other cases, the database controller may operate automatically without user interaction.

FIG. 8 shows an example of a machine learning apparatus according to aspects of the present disclosure. The example shown includes processor unit 800, memory unit 805, query component 810, training component 815, and machine learning model 820.

Processor unit 800 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 800 is configured to operate a memory array using a memory controller. In other cases, a memory controller is integrated into processor unit 800. In some cases, processor unit 800 is configured to execute computer-readable instructions stored in memory unit 805 to perform various functions. In some embodiments, processor unit 800 includes special purpose components for modem processing, baseband processing, digital signal processing, or transmission processing.

Memory unit 805 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 800 to perform various functions described herein. In some cases, memory unit 805 contains, among other things, a basic input/output system (BIOS) which controls basic hardware or software operation such as the interaction with peripheral components or devices. In some cases, memory unit 805 includes a memory controller that operates memory cells of memory unit 805. For example, the memory controller may include a row decoder, column decoder, or both. In some cases, memory cells within memory unit 805 store information in the form of a logical state.

According to some aspects, query component 810 is configured to receive an image generation prompt that includes a text description of target image content and color information describing a target color palette. In some aspects, the color information includes a visual or a text description of the target color palette. Query component 810 is an example of, or includes aspects of, the corresponding element described with reference to FIG. 9. Query component 810 may be implemented as a hardware circuit, in firmware, or as a software component.

Machine learning model 820 may include one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In one aspect, machine learning model 820 includes multi-modal encoder 825, image decoder 830, text-to-color encoder 835, and image-to-color encoder 840. Each of multi-modal encoder 825, image decoder 830, text-to-color encoder 835, and image-to-color encoder 840 may include one or more ANNs.

In one aspect, machine learning model 820 includes multi-modal encoder 825. The term "muti-modal" refers to an encoder that operates with different modalities of input information. For example, a multi-modal encoder may be capable of receiving an image and text as input, and encoding the image and the text in a same embedding space. In at least one embodiment, the multi-modal encoder is implemented as a Contrastive Learning-Image Pre-Training (CLIP) model. CLIP is an example of a multi-modal encoder that is trained to efficiently learn visual concepts from natural language supervision. CLIP is a neural network that can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

According to some aspects, multi-modal encoder 825 encodes the image generation prompt to obtain image features that represent the target image content and the target color palette. In some examples, multi-modal encoder 825 encodes the text description to obtain content features.

According to some aspects, multi-modal encoder 825 generates a first content embedding based on a text description of the training image. In some examples, multi-modal encoder 825 generates a second content embedding based on the output image.

According to some aspects, multi-modal encoder 825 is configured to encode the image generation prompt to obtain image features that represent the target image content and the target color palette. In some aspects, multi-modal encoder 825 is configured to generate output image features based on the generated image. In some aspects, multi-modal encoder 825 includes a Contrastive Language-Image Pre-Training (CLIP) neural network. Multi-modal encoder 825 is an example of, or includes aspects of, the corresponding element described with reference to FIGS. 4 and 9.

According to some aspects, image decoder 830 generates an image representing the target image content with the target color palette based on the image features. In some examples, image decoder 830 includes a general adversarial network (GAN) and generates the image using the GAN. A generative adversarial network (GAN) is a category of ANN where two neural networks are trained based on a contest with each other. Given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

According to some aspects, image decoder 830 includes a vector quantized GAN (VQGAN). A VQGAN is a GAN that includes two convolutional neural networks (CNNs) to encode an input and decode an output, respectively. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

A VQGAN divides an output of an image encoder into n×n blocks that are further quantized to fit into a nearest vector in a codebook of learned representations, such that any image can be represented by a spatial collection of codebook entries. The codebook is trained to have diverse feature representations of different regions included in a given dataset. In at least one embodiment, the image encoder is a CNN encoder. In at least one embodiment, the image encoder is multi-modal encoder 825.

In some examples, image decoder 830 regenerates the image based on the updated image features. In some examples, image decoder 830 quantizes the image features based on a feature codebook to obtain first quantized image features. In some examples, image decoder 830 decodes the first quantized image features to obtain an initial image. In some examples, image decoder 830 quantizes the image features based on a feature codebook and the combined loss to obtain second quantized image features. In some examples, image decoder 830 decodes the second quantized image features to obtain the image.

According to some aspects, image decoder 830 generates an output image based on the training image using machine learning model 820. In some examples, image decoder 830 quantizes the image features based on a feature codebook to obtain quantized image features. In some examples, image decoder 830 decodes the quantized image features to obtain the output image. In some examples, image decoder 830 divides the image features into a set of feature blocks. In some examples, image decoder 830 selects a code from the feature codebook that is closest to each of the set of feature blocks, where the quantized image features are based on the selected code.

According to some aspects, image decoder 830 is configured to generate an image representing the target image content with the target color palette based on the image features, wherein image decoder 830 is trained based on a comparison of a color text description to output image colors. In some aspects, the image decoder 830 includes a vector quantized general adversarial network (VQGAN). Image decoder 830 is an example of, or includes aspects of, the corresponding element described with reference to FIGS. 4 and 9.

According to some aspects, text-to-color encoder 835 includes blocks of fully connected, ReLu and L2 norm layers, and text-to-color encoder 835 may pass sentence embeddings to the blocks. In an ANN, an activation function may be used to transform summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks. L2 Norm layers restrict values obtain from precious layers to the 0 to 1 range.

According to some aspects, text-to-color encoder 835 encodes the color information to obtain color features, where the image features include the content features and the color features. According to some aspects, text-to-color encoder 835 generates a first color embedding based on the color information. According to some aspects, text-to-color encoder 835 is configured to generate a color embedding based on the color text description, wherein the image features are based on the color embedding. Text-to-color encoder 835 is an example of, or includes aspects of, the corresponding element described with reference to FIG. 4.

According to some aspects, image-to-color encoder 840 is configured to generate a color embedding based on the output image colors, wherein the image features are based on the color embedding. According to some aspects, image-to-color encoder 840 generates a second color embedding based on the output image. Image-to-color encoder 840 is an example of, or includes aspects of, the corresponding element described with reference to FIG. 4.

According to some aspects, training component 815 is configured to update parameters of machine learning model 820. According to some aspects, training component 815 computes a color loss by comparing a color embedding of the image and an embedding of the target color palette. In some examples, training component 815 updates the image features based on the color loss. In some examples, training component 815 computes a content loss based on the content features and the initial image. In some examples, training component 815 computes a color loss based on the color features and the initial image. In some examples, training component 815 adds the content loss and the color loss to obtain a combined loss. In some examples, training component 815 back-propagates the combined loss.

According to some aspects, training component 815 receives training data including a training image and color information describing a target color palette. In some examples, training component 815 updates the machine learning model 820 based on the first color embedding and the second color embedding. In some examples, training component 815 computes a color loss based on the first color embedding and the second color embedding, where the machine learning model 820 is updated based on the color loss. In some examples, training component 815 computes a content loss based on the first content embedding and the second content embedding, where the machine learning model 820 is updated based on the content loss. In some examples, training component 815 updates the image features based on the first color embedding and the second color embedding.

According to some aspects, training component 815 is configured to update the image decoder 830 based on the color text description and the output image colors. In some examples, training component 815 trains image decoder 830 based on a comparison of the color text description to the output image colors. Training component 815 may be implemented as a hardware circuit, in firmware, or as a software component.

FIG. 9 shows an example of image generation according to aspects of the present disclosure. The example shown includes query component 900, image generation prompt 905, multi-modal encoder 910, image features 915, image decoder 920, and image 925.

Referring to FIG. 9, query component 900 passes image generation prompt 905 to multi-modal encoder 910. Multi-modal encoder 910 outputs image features 915 in response to receiving image generation prompt 905. Image decoder 920 receives image features 915 as input and generates image 925 based on image features 915.

Query component 900 is an example of, or includes aspects of, the corresponding element described with reference to FIG. 8. Image generation prompt 905 is an example of, or includes aspects of, the corresponding element described with reference to FIGS. 1 and 4-6. Multi-modal encoder 910 is an example of, or includes aspects of, the corresponding element described with reference to FIGS. 4 and 8. Image features 915 is an example of, or includes aspects of, the corresponding element described with reference to FIG. 4. Image decoder 920 is an example of, or includes aspects of, the corresponding element described with reference to FIGS. 4 and 8. Image 925 is an example of, or includes aspects of, the corresponding element described with reference to FIGS. 5 and 6.

Training

A method for color optimization in generated images is described. One or more aspects of the method include receiving training data including a training image and color information describing a target color palette; generating an output image based on the training image using a machine learning model; generating a first color embedding based on the color information; generating a second color embedding based on the output image; and updating the machine learning model based on the first color embedding and the second color embedding.

Some examples of the method further include computing a color loss based on the first color embedding and the second color embedding, wherein the machine learning model is updated based on the color loss. Some examples of the method further include generating a first content embedding based on a text description of the training image using a multi-modal encoder. Some examples further include generating a second content embedding based on the output image using the multi-modal encoder. Some examples further include computing a content loss based on the first content embedding and the second content embedding, wherein the machine learning model is updated based on the content loss.

Some examples of the method further include comparing the training image to the output image using a discriminator network, wherein the machine learning model is updated based on the comparison. Some examples of the method further include encoding the training image using an image encoder to obtain image features. Some examples further include quantizing the image features based on a feature codebook to obtain quantized image features. Some examples further include decoding the quantized image features to obtain the output image.

Some examples of the method further include updating the image features based on the first color embedding and the second color embedding. Some examples of the method further include dividing the image features into a plurality of feature blocks. Some examples further include selecting a code from the feature codebook that is closest to each of the plurality of feature blocks, wherein the quantized image features are based on the selected code.

Figure 10:
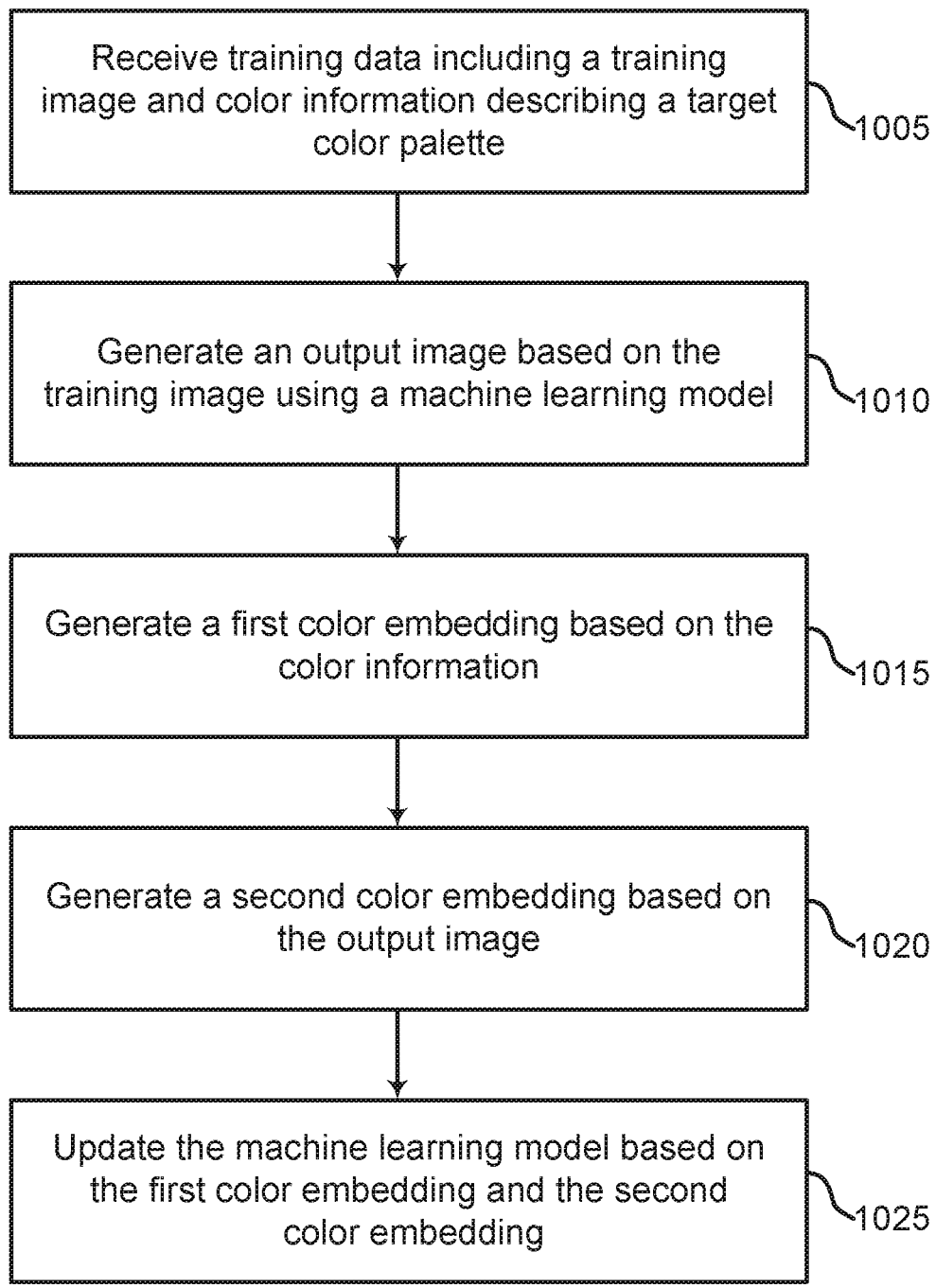
FIG. 10 shows an example of updating a machine learning model based on color embeddings according to aspects of the present disclosure.

FIG. 10 shows an example of updating a machine learning model based on color embeddings according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system receives training data including a training image and color information describing a target color palette. In some cases, the operations of this step refer to, or may be performed by, a training component as described with reference to FIG. 7. For example, the training component may retrieve the training image from a training image dataset stored in a database as described with reference to FIG. 6, and may receive the color information provided by a query component of the machine learning apparatus as part of an image generation prompt.

At operation 1010, the system generates an output image based on the training image using a machine learning model. In some cases, the operations of this step refer to, or may be performed by, an image decoder as described with reference to FIGS. 7-9. For example, the training component may provide the training image to an image encoder of the image decoder, and the image encoder may encode the training image to obtain image features. In at least one embodiment, the image encoder is the multi-modal encoder as described with reference to FIG. 8.

The image decoder may quantize the image features based on a feature codebook to obtain quantized image features, and may decode the quantized image features to obtain the output image. In at least one embodiment, the image decoder divides the image features into a plurality of feature blocks, and selects a code from the feature codebook that is closest to each of the plurality of feature blocks. The quantized image features may be based on the selected code.

In at least one embodiment, a discriminator network of the image decoder compares the training image to the output image, and the machine learning model is updated based on the comparison. For example, the generator network may generate candidates while the discriminator network evaluates them. The generator network may learn to map from a latent space to a data distribution of interest, while the discriminator network may distinguish candidates produced by generator network from the true data distribution. The generator network training objective is to increase the error rate of the discriminator network (i.e., to produce novel candidates that the discriminator network classifies as real). The generator network and image encoder are thereby updated by iteratively generating output images based on the discriminator network failing to distinguish output images from training images.

In at least one embodiment, the image encoder and the multi-modal encoder are jointly trained by the training component. In at least one embodiment, at least one of the image encoder and the multi-modal encoder are randomly initialized.

At operation 1015, the system generates a first color embedding based on the color information. In some cases, the operations of this step refer to, or may be performed by, a text-to-color encoder as described with reference to FIG. 9. For example, the text-to-color encoder may generate a first color embedding based on the color information. For example, the text-to-color encoder may convert text into a color embedding in a same embedding space as pixel color embeddings. In at least one embodiment, the text-to-color encoder is pretrained on a dataset that includes text description of colors and color embeddings of corresponding RGB values. The text-to-color encoder may convert the color information into a sentence embedding. In at least one embodiment, the sentence embedding is a cross-lingual sentence embedding produced by a model such as Multilingual USE. In at least one embodiment, the text-to-color encoder includes blocks of fully connected, ReLu and L2 norm layers, and the text-to-color encoder may pass the sentence embedding to the blocks.

The text-to-color encoder may collect samples from the dataset using a negative mining strategy of finding a pair of sample embeddings with similar but not the same corresponding color information to obtain hard negatives. The training component may use a metric learning loss similar to a triplet loss to fine-tune the text-to-color encoder such that a generated color embedding such as the first color embedding is pushed closer to a corresponding positive color embedding and pushed away from a corresponding negative color embedding.

In at least one embodiment, the color information is a visual depiction of the target color palette such as an image, and the visual depiction of the target color palette is input to image-to-color encoder to generate the first color embedding using a similar process as described in operation 1020.

At operation 1020, the system generates a second color embedding based on the output image. In some cases, the operations of this step refer to, or may be performed by, an image-to-color encoder as described with reference to FIG. 9. For example, the Image-to-color encoder may generate a second color embedding based on the output image. For example, the image-to-color encoder may convert the output image from "RBG" color space to "LAB" color space. If two color vectors in RGB space are close to each other in terms of L2 distance, they are not necessarily close to each other in terms of human visual perception. By contrast, in LAB color space, color vectors are designed to be perceptually uniform with respect to human color vision, meaning that an amount of numerical change in color vectors corresponds to a same amount of visually perceivable change.

Accordingly, in at least one embodiment, the image-to-color encoder uses 3D histograms in LAB space to generate the second color embedding. The image-to-color encoder may concatenate two histograms to obtain one feature vector. In at least one embodiment, the image-to-color encoder calculates a first histogram using [9, 7, 8] interval sizes and a second histogram using [10, 10, 10] interval sizes. The image-to-color encoder may take the square root of each number in the feature vector to obtain the second color embedding.

In at least one embodiment, the training component trains a regression model of the machine learning model using the training images in the training image set and associated histogram color embeddings (for example, training image 900 and the second color embedding) as ground truths to generate similar color embeddings as the histogram color embeddings. In at least one embodiment, the regression model is an EfficientNet or similar network that includes a final layer having dimensions equal to the histogram color embeddings. The similar color embeddings may be used to calculate losses.

At operation 1025, the system updates the machine learning model based on the first color embedding and the second color embedding. In some cases, the operations of this step refer to, or may be performed by, a training component as described with reference to FIG. 7. For example, the training component may calculate a color loss based on the first color embedding and the second embedding, and may update parameters of components of the machine learning model based on the color loss. In at least one embodiment, the color loss is a mean squared error loss.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

Figure 11:
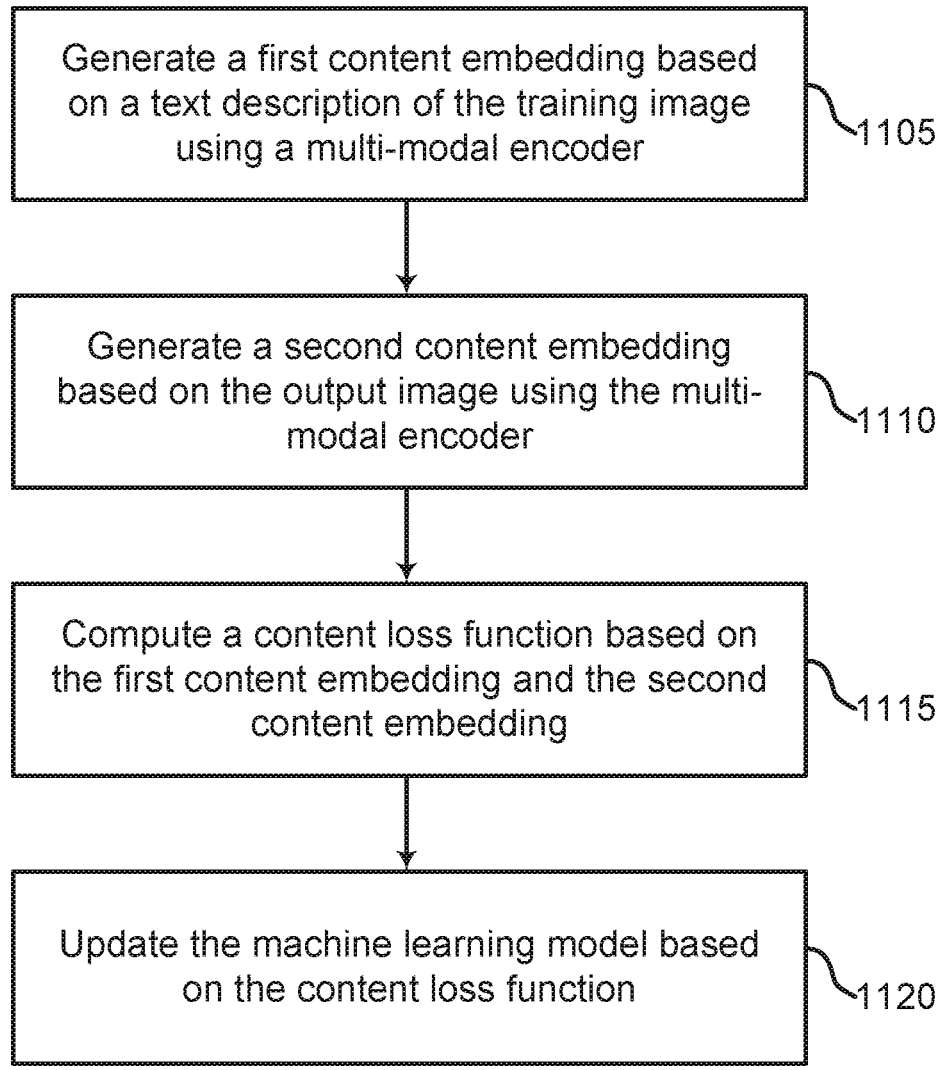
FIG. 11 shows an example of computing a content loss according to aspects of the present disclosure.

FIG. 11 shows an example of computing a content loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a first content embedding based on a text description of the training image using a multi-modal encoder. In some cases, the operations of this step refer to, or may be performed by, a multi-modal encoder as described with reference to FIGS. 7-9. For example, the multi-modal encoder may generate a first content embedding based on a text description of a training image or on the training image itself as described with reference to FIGS. 4 and 5.

At operation 1110, the system generates a second content embedding based on the output image using the multi-modal encoder. In some cases, the operations of this step refer to, or may be performed by, a multi-modal encoder as described with reference to FIGS. 7-9. For example, the multi-modal encoder may generate a second content embedding based on the output image.

At operation 1115, the system computes a content loss based on the first content embedding and the second content embedding. In some cases, the operations of this step refer to, or may be performed by, a training component as described with reference to FIG. 7. In at least one embodiment, the content loss is a mean square error loss.

At operation 1120, the system updates the machine learning model based on the content loss. In some cases, the operations of this step refer to, or may be performed by, a training component as described with reference to FIG. 7. For example, the training component may update parameters of the components of the machine learning model based on the content loss.

In some examples, the training component computes a combined loss by adding the color loss to the content loss, and updates parameters of components of the machine learning model based on the combined loss.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
receiving an image generation prompt that includes a text description of target image content and color information describing a target color palette;
encoding the image generation prompt to obtain image features that represent the target image content and the target color palette;
generating an image representing the target image content with the target color palette based on the image features;
computing a combined loss including a content loss and color loss, wherein the content loss is computed based on the text description and the image and the color loss is computed based on the color information and the image;
quantizing the image features based on a pre-trained feature codebook and the combined loss to obtain quantized image features; and
decoding the quantized image features to obtain an additional image representing the target image content with the target color palette.

2. The method of claim 1, further comprising:
encoding the text description using a multi-modal encoder to obtain content features; and
encoding the color information using a text-to-color encoder to obtain color features, wherein the image features comprise the content features and the color features.

3. The method of claim 1, further comprising:
computing the color loss by comparing a color embedding of the image and an embedding of the target color palette;
updating the image features based on the color loss; and
regenerating the image based on the updated image features.

4. The method of claim 1, wherein:
the color information includes a visual or a text description of the target color palette.

5. The method of claim 1, further comprising:
adding the content loss and the color loss to obtain the combined loss.

6. A method for image generation, comprising:
receiving training data including a training image and color information describing a target color palette;
generating an output image based on the training image using a machine learning model;
generating a first color embedding in a color vector space based on the color information;
generating a second color embedding in the color vector space based on the output image; and updating the machine learning model based on a comparison of the first color embedding and the second color embedding in the color vector space.

7. The method of claim 6, further comprising:
computing a color loss based on the first color embedding and the second color embedding, wherein the machine learning model is updated based on the color loss.

8. The method of claim 6, further comprising:
generating a first content embedding based on a text description of the training image using a multi-modal encoder;
generating a second content embedding based on the output image using the multi-modal encoder; and
computing a content loss based on the first content embedding and the second content embedding, wherein the machine learning model is updated based on the content loss.

9. The method of claim 6, further comprising:
comparing the training image to the output image using a discriminator network, wherein the machine learning model is updated based on the comparison.

10. The method of claim 6, further comprising:
encoding the training image using an image encoder to obtain image features;
quantizing the image features based on a feature codebook to obtain quantized image features; and
decoding the quantized image features to obtain the output image.

11. The method of claim 10, further comprising:
updating the image features based on the first color embedding and the second color embedding.

12. The method of claim 10, further comprising:
dividing the image features into a plurality of feature blocks; and
selecting a code from the feature codebook that is closest to each of the plurality of feature blocks, wherein the quantized image features are based on the selected code.

13. An apparatus for image generation, comprising:
a query component configured to receive an image generation prompt that includes a text description of target image content and color information describing a target color palette;
a multi-modal encoder configured to encode the image generation prompt to obtain image features that represent the target image content and the target color palette;
an image decoder configured to generate an image representing the target image content with the target color palette based on the image features, wherein the image decoder is trained based on a comparison of a color text description to output image colors; and
a training component configured to compute a combined loss including a content loss and color loss, wherein the content loss is computed based on the text description and the image and the color loss is computed based on the color information and the image,
wherein the image decoder is further configured to quantize the image features based on a pre-trained feature codebook and the combined loss to obtain quantized image features and to decode the quantized image features to obtain an additional image representing the target image content with the target color palette.

14. The apparatus of claim 13, wherein:
the training component is further configured to update the image decoder based on the color text description and the output image colors.

15. The apparatus of claim 13, further comprising:
a text-to-color encoder configured to generate a color embedding based on the color text description, wherein the image features are based on the color embedding.

16. The apparatus of claim 13, further comprising:
an image-to-color encoder configured to generate a color embedding based on the output image colors, wherein the image features are based on the color embedding.

17. The apparatus of claim 13, wherein:
the multi-modal encoder is configured to generate output image features based on the generated image.

18. The apparatus of claim 13, wherein:
the multi-modal encoder comprises a Contrastive Language-Image Pre-Training (CLIP) neural network.

19. The apparatus of claim 13, wherein:
the image decoder includes a vector quantized general adversarial network (VQGAN).

* * * * *